US012725954B2

(12) United States Patent
Glössl et al.

(10) Patent No.: US 12,725,954 B2
(45) Date of Patent: Sep. 1, 2026

(54) MULTI COUPLING FOR COUPLING LINES WITH AN ALIGNMENT AID

(71) Applicant: qoncept engineering GmbH, Leoben (AT)

(72) Inventors: Christian Glössl, Deutschfeistritz (AT); Heinz Rumpler, Leoben (AT); Sebastian Michelic, Trofaiach (AT)

(73) Assignee: qoncept engineering GmbH, Leoben (AT)

( * ) Notice: Subject to any disclaimer, the term of this patent is extended or adjusted under 35 U.S.C. 154(b) by 563 days.

(21) Appl. No.: 18/009,819

(22) PCT Filed: Nov. 13, 2020

(86) PCT No.: PCT/AT2020/060402

§ 371 (c)(1),
(2) Date: Dec. 12, 2022

(87) PCT Pub. No.: WO2022/032313

PCT Pub. Date: Feb. 17, 2022

(65) Prior Publication Data

US 2023/0246367 A1 Aug. 3, 2023

(30) Foreign Application Priority Data

Aug. 14, 2020 (AT) .............................. A 50684/2020

(51) Int. Cl.
*H01R 13/00* (2006.01)
*F16L 37/50* (2006.01)
(Continued)

(52) U.S. Cl.
CPC ............ *H01R 13/005* (2013.01); *F16L 37/50* (2013.01); *F16L 37/56* (2013.01); *F16L 39/04* (2013.01)

(58) Field of Classification Search
CPC ........ H01R 13/005; F16L 37/50; F16L 37/56; F16L 39/04; F16L 41/001; F16L 39/00; F16L 37/58
See application file for complete search history.

(56) References Cited

U.S. PATENT DOCUMENTS 3,774,636 A 11/1973 Arita
4,378,945 A 4/1983 Trautman
(Continued)

FOREIGN PATENT DOCUMENTS

CN 108390237 A 8/2018
DE 2242715 A1 3/1973
(Continued)

OTHER PUBLICATIONS

Espacenet English abstract for DE 102012023392 A1, Jun. 5, 2014.
(Continued)

*Primary Examiner* — Jason D Shanske
*Assistant Examiner* — Al-Birr Rahman Chowdhury
(74) *Attorney, Agent, or Firm* — Tiajoloff & Kelly LLP

(57) ABSTRACT

A multi-coupling has an alignment aid with first and second coupling parts compensating for offset tolerances during coupling of medium couplings. At least one coupling part has a coupling carrier mounted floatingly transversely with respect to the coupling direction, and the alignment aid has, on one coupling part, a central precentring journal protruding in the coupling direction and a precision centring journal protruding from a coupling carrier in the coupling direction and arranged radially around the precentring journal axis. The precision centering journal head is set back in the coupling direction with respect to the precentring journal head, and the alignment aid has, on the coupling socket side, a central jaw that merges into a precentring guide for the precentring journal and is equipped with at least one preci-
(Continued)

Figure 1:
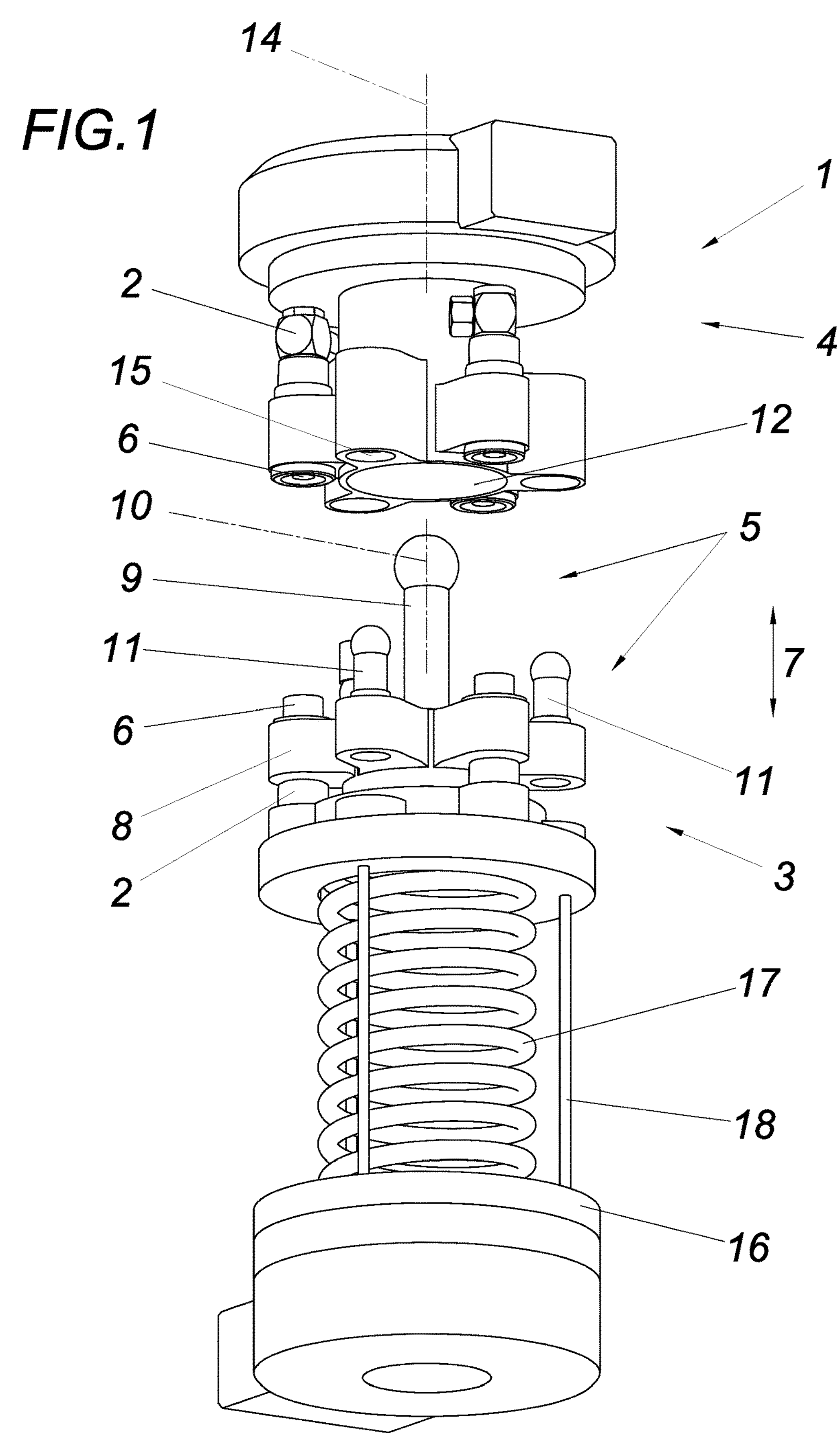

sion centering guide, arranged around the precentring guide axis, for the precision centering journal.

20 Claims, 7 Drawing Sheets

(51) Int. Cl.
*F16L 37/56* (2006.01)
*F16L 39/04* (2006.01)

(56) References Cited

U.S. PATENT DOCUMENTS

| | | | | |
|---|---|---|---|---|
| 10,550,360 | B2 * | 2/2020 | Grosch | A61M 39/223 |
| 11,009,167 | B2 | 5/2021 | Rapien | |
| 2008/0036199 | A1 * | 2/2008 | Asam | F16L 37/56 285/33 |
| 2014/0112699 | A1 | 4/2014 | Lewkoski | |
| 2020/0041057 | A1 * | 2/2020 | Rapien | F16L 37/54 |

FOREIGN PATENT DOCUMENTS

| | | | |
|---|---|---|---|
| DE | 3843418 | A1 | 6/1990 |
| DE | 102009058177 | A1 | 6/2011 |
| DE | 102012023392 | A1 | 6/2014 |
| EP | 3608577 | A1 | 2/2020 |
| FR | 2667126 | A1 | 3/1992 |
| GB | 2246553 | A | 2/1992 |
| NL | 8200780 | A | 9/1983 |
| SU | 1460518 | A1 | 2/1989 |
| WO | 0243884 | A1 | 6/2002 |
| WO | 2014082893 | A1 | 6/2014 |

OTHER PUBLICATIONS

Espacenet English abstract for DE 3843418 A1, Jun. 28, 1990.
Espacenet English abstract for FR 2667126 A1, Mar. 27, 1992.
Espacenet English abstract for NL 8200780 A , Sep. 16, 1983.

* cited by examiner 14
1
2
4
15
12
6
10
5
9
7
11
6
11
8
3
2
17
18
16

14
4
13
12
5
9
10
1
11
11
8
7
3
17
18
16

14
4
13
12
11
11
5
9
10
1
8
7
3
17
18
16

MULTI COUPLING FOR COUPLING LINES WITH AN ALIGNMENT AID

FIELD OF THE INVENTION

The invention relates to a multi-coupling for coupling lines with an alignment aid assigned to a first coupling part, in particular a coupling plug, and a second coupling part, in particular a coupling socket, for compensating for offset tolerances during threading of the coupling plug into the coupling socket.

DESCRIPTION OF THE PRIOR ART

Multi-couplings couple, i.e. connect or disconnect, several fluid, pneumatic and/or electrical lines simultaneously. Multi-couplings usually comprise a loose half and a fixed half or two loose halves and consist of carrier plates, media couplings, electrical elements, guide elements and, optionally, additional operating and locking elements. The multi-coupling can couple gases, liquids, electricity and signals and carries the subordinate coupling points for the media mentioned. The couplings can be used under almost all environmental conditions. Numerous applications are possible ranging from steelworks to industry, agriculture and transport.

Fluid couplings are known, for example, from FR 2667126 B1, DE 10 2009 058 177 A1 and DE 10 2012 023 392 A1. DE 10 2009 058 177 A1 discloses a device for coupling a supply line carrying a lubricant-gas flow to a machine, in which at least one lubrication point is lubricated by means of the lubricant transported by the lubricant-gas flow, wherein the device comprises a coupling head connected to the supply line and movable away from and towards the machine, and a receiving unit arranged on the machine.

Multi-couplings that are the subject matter of the invention are designed to be particularly robust and temperature-resistant. The term multi-coupling is intended to indicate that the device accommodates several connections for technical media. A multi-coupling according to the invention must be able to supply a moving or movable object, e.g. a steel ladle in heavy industry, a transport trolley or a vehicle, with various technical media (gas, liquid or even electricity) or with signals. Since the object can move between different points, a conventional supply with supply lines is not feasible in practice. It must therefore be ensured that the object can be quickly and safely connected to any supply lines at a respective working or parking position.

SUMMARY OF THE INVENTION

The invention is thus based on the object of creating a media coupling of the type described at the beginning, which is highly fault-tolerant with regard to offset tolerances when coupling a first and a second coupling part, in particular the coupling plug and coupling socket, and which functions properly under difficult operating conditions in industry at higher temperatures, harsh ambient conditions and heavy dust loads, and ensures reliable alignment of several media couplings assigned to the coupling parts with respect to each other and in order to avoid damage to the media couplings during coupling due to overload.

The invention solves the problem posed in that a coupling part has a coupling carrier which is mounted in a floating manner transversely with respect to the coupling direction, by the fact that the alignment aid has, on one coupling part, a central pre-centering journal which protrudes from a coupling carrier in the coupling direction and at least one precision centering journal which projects from the coupling carrier in the coupling direction and is arranged radially about the pre-centering journal axis, wherein the precision centering journal head is set back in the coupling direction relative to the pre-centering journal head, and in that the alignment aid has, on the coupling socket side, a central catching jaw which merges in the coupling direction into a pre-centering guide for the pre-centering journal and is equipped with at least one precision centering guide, arranged about the pre-centering guide axis, for the precision centering journal. According to this design variant, the pre-centering and precision centering journals are assigned to the same coupling part.

However, the invention also solves the problem posed in that pre-centering and precision centering journals are each assigned to the opposite other coupling part, i.e. in that one coupling part has a coupling carrier floating transversely to the direction of coupling, in that the alignment aid on one coupling part has a central pre-centering journal projecting from a coupling carrier in the coupling direction and at least one precision centering guide arranged around the pre-centering journal axis for a precision centering journal, and in that the alignment aid on the other coupling part has a central catching jaw and at least one precision centering journal arranged radially around the catching jaw and projecting from the coupling carrier in the coupling direction, wherein the head of the precision centering journal projects less far beyond the coupling carrier associated therewith than the head of the pre-centering journal from the other coupling carrier associated therewith, and in that the central catching jaw merges into a pre-centering guide in the coupling direction. The coupling carrier is preferably mounted resiliently in the coupling direction.

The multi-coupling according to the invention ensures a safe alignment of several media couplings assigned to a first and a second coupling part, for example coupling plug and coupling socket, to each other before a media connection is established by coupling the media couplings. Preferably, a movable object is equipped with a rigidly mounted coupling socket. Preferably, a flexible coupling plug is mounted on a fixed supply point. The flexibility of the coupling plug is provided by the coupling carrier mounted in a floating manner transversely to the coupling direction, which serves to compensate for practical tolerances when coupling the object to the stationary coupling point. However, the positions of the first and second coupling parts or of the coupling plug and coupling socket are mutually interchangeable. When the coupling plug and coupling socket approach each other, the pre-centering journal is caught by the catching jaw and inserted into the pre-centering guide as they continue to approach each other, thus compensating for any lateral offset between the coupling plug and coupling socket that lies within the catching tolerance. For this purpose, the pre-centering journal has, in particular, a ball, mushroom or conical head which merges into a cylindrical journal. When the pre-centering journal is inserted into the pre-centering guide, the coupling plug and coupling socket are initially aligned at least approximately parallel to the axis. Subsequently, three precision centering journals arranged radially around the pre-centering journal axis, the precision centering journal heads of which are set back in the coupling direction relative to the pre-centering journal head, slide into the precision centering guides preferably via smaller jaws, in particular centering cones, whereby a precision alignment with respect to an axial offset and a rotational offset between the coupling plug and coupling socket takes place towards an end position. The precision centering guides may themselves have or be media couplings. Only then, a mechanical connection of the other media couplings takes place. Preferably three precision centering journals arranged radially around the pre-centering journal axis allow particularly advantageous alignment of the coupling parts, although one, two or possibly more would also fulfill the function.

The following types of coupling, for example, are conceivable without any claim to completeness. Automatic coupling by bringing the objects together, in particular by placing them vertically or at an angle by means of lifting gear, such as a crane, inclined elevator or the like, wherein the force required for the coupling process is applied by gravity, i.e. by the mass of the object brought up. Coupling in an approximately horizontal direction in the course of moving a vehicle to a stop position. An automatic coupling by bringing together two moving objects in any direction, e.g. a coupling of two cars. A motion control for a minimum start-up impact is assumed. Also a forced merging of one or both coupling parts by additional actuators, e.g. coupling of a vehicle in a parking position (refueling, electric power supply, . . . ) or a coupling of a device and driving over a certain distance for the supply of process-specific fluids, gases, electrics, measurement technology is possible.

The connection is made by moving the coupling plug and coupling socket towards each other and a moving object is placed on an assigned tolerance position or remains there. The multi-coupling can be designed with a horizontal or vertical coupling axis or with an arbitrarily aligned coupling axis.

In order to permit a generous offset tolerance, the coupling carrier is mounted so as to float transversely to the coupling direction with respect to a carrier base, for which purpose at least one spring is arranged between the coupling carrier and the carrier base, which spring is pretensioned by means of tensioning means acting at one end on the coupling carrier and at the other end on the carrier base. If the coupling carrier, the carrier base floating transversely to the coupling direction and the tensioning means form a kind of articulated parallelogram for at least approximately axis-parallel alignment of the coupling parts during coupling of lines, both coupling parts remain at least approximately axis-parallel in the course of a coupling process, which facilitates bringing the couplings together.

Particularly preferably, at least one spring, in particular three springs, preferably helical springs, arranged in a star shape around the longitudinal axis of the coupling, is arranged between the coupling carrier and the carrier base. If properly dimensioned, the interaction between springs and tensioning means can thus ensure that the coupling carrier is guided at least approximately plane-parallel to the carrier base during lateral alignment in the course of pre-centering, thus keeping wear to a minimum and improving the smooth running of the coupling. Connecting lines between the media lines assigned to the coupling carrier and a media source can advantageously be guided in and/or between the springs. The tensioning means serve to pretension the springs so that the spring forms an S-shape during a transverse movement between the coupling carrier and the carrier base and thus the coupling carrier remains approximately axially parallel to the carrier base.

The spring pretensioning force can be adjusted within the connector by means of tensioning means, ropes or the like, depending on the technical requirements for the media to be transmitted. A locking device for the transmission of higher pressures or closing forces can be provided in case of insufficient spring force. The at least one spring causes a reduction in the forces acting on couplings and connecting structures. Only the spring force from the coupling plug acts on the connecting structure of the coupling. Shock loads or above-average forces acting on the multi-coupling are avoided.

The special spring technology in the coupling plug allows large offset tolerances during the coupling process and in coupled position. The springs installed in the coupling plug have a high degree of flexibility, which ensures parallelism between the coupling plug and the coupling socket at the end of the coupling process. This is made possible by a special spring assembly or by a single spring. The spring, which is clamped at both ends, at one end on the coupling carrier and at the other end on the carrier base, describes an "S" shape with a corresponding offset between the coupling plug and coupling socket. Three springs create a statically defined three-point support. This design ensures that all contact surfaces are guided in a parallel and coaxial manner relative to each other.

The pre-centering journal can itself optionally form a media coupling or an actuator. In this case, the mating coupling must be installed recessed in the pre-centering guide in such a way that a coupling only takes place after the coupling plug and coupling socket have been aligned. Similarly, at least one precision centering journal can itself form a media coupling or an actuator.

In order to be able to arrange a large number of media couplings on a small surface area, the coupling carrier can accommodate several media couplings, in particular arranged in a star shape or on a circular path, around the pre-centering journal axis. This creates a modular system with which appropriate media couplings can be configured according to requirements. The modularity of couplings with this flexibility is unique. Actuators can also be provided instead of media couplings.

To avoid distortions in the system, media couplings can be mounted floating in the coupling carrier transverse to the coupling direction.

A coupling part according to the invention, namely a coupling plug for a multi-coupling, comprises a central pre-centering journal projecting in the coupling direction from a coupling carrier of the coupling plug, which is floatingly mounted transversely to the coupling direction and resiliently mounted in the coupling direction, and three precision centering journals arranged radially around the pre-centering journal axis and projecting from the coupling carrier in the coupling direction, wherein the precision centering journal heads are set back in the coupling direction relative to the pre-centering journal head, and by a plurality of media couplings arranged in a star shape around the pre-centering journal axis.

A coupling part according to the invention, namely a coupling socket for a multi-coupling comprises a central catching jaw which merges into a pre-centering guide in the coupling direction, by three precision centering guides arranged in a star shape around the pre-centering guide axis and by a plurality of media couplings arranged in a star shape around the pre-centering guide axis.

In order to be able to compensate for particular offset tolerances, it may be advantageous for both coupling parts to have a coupling carrier which is floatingly mounted transversely to the coupling direction. Pre-centering and precision centering can be assigned to the respective other coupling part. Actuators can also be integrated in the coupling parts.

Each coupling part, i.e. in particular coupling plug and coupling socket, can be equipped with actuators, for example a linear cylinder or rotary actuator, for bringing together or pulling together the coupling plug and coupling socket. This can also provide for locking of the multi-coupling when the coupling plug is properly connected to the coupling socket. Likewise, the pre-centering journal or the precision centering journals themselves can have or be corresponding actuators.

BRIEF DESCRIPTION OF THE INVENTION

Figure 2:
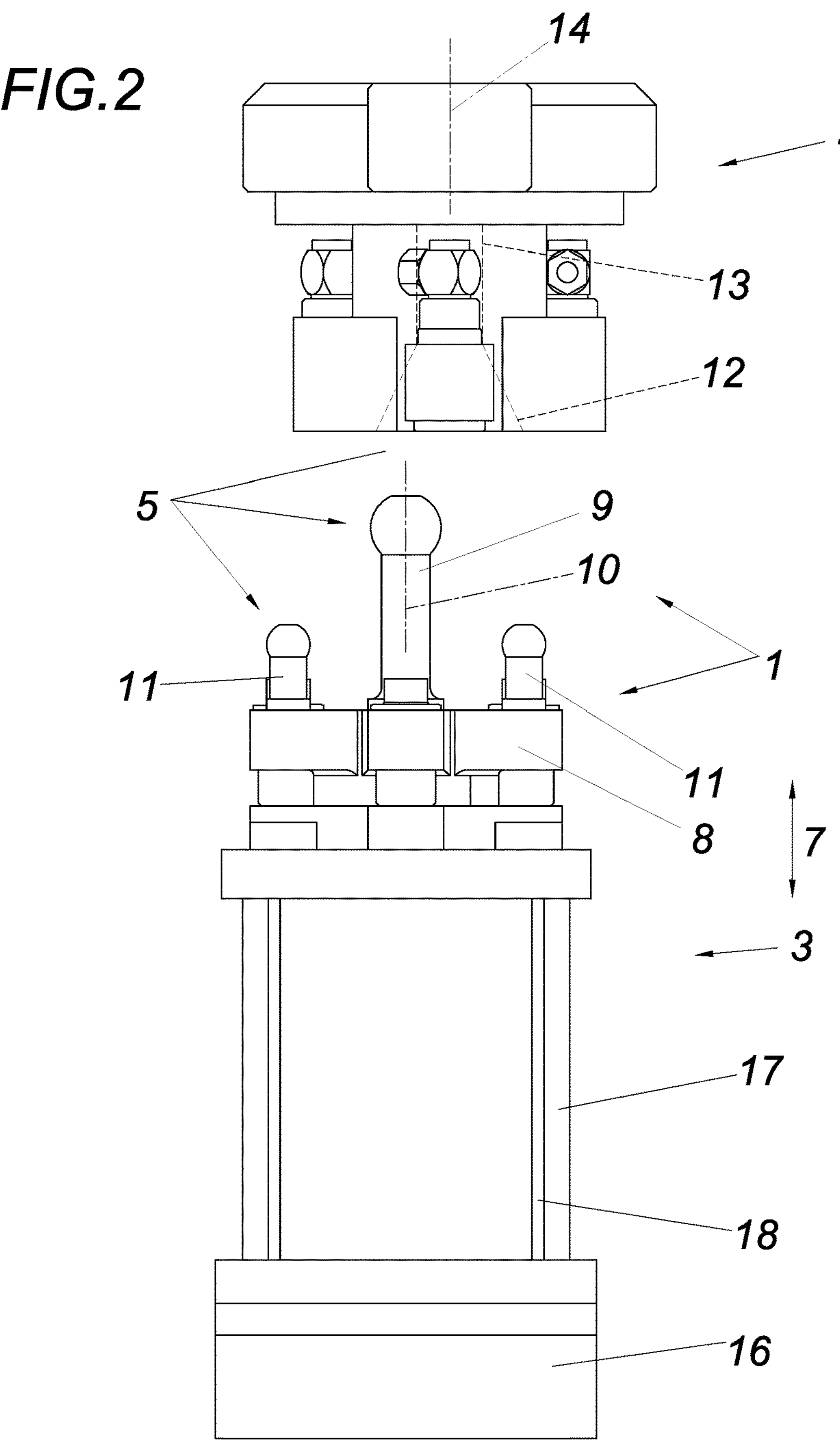
Figure 3:
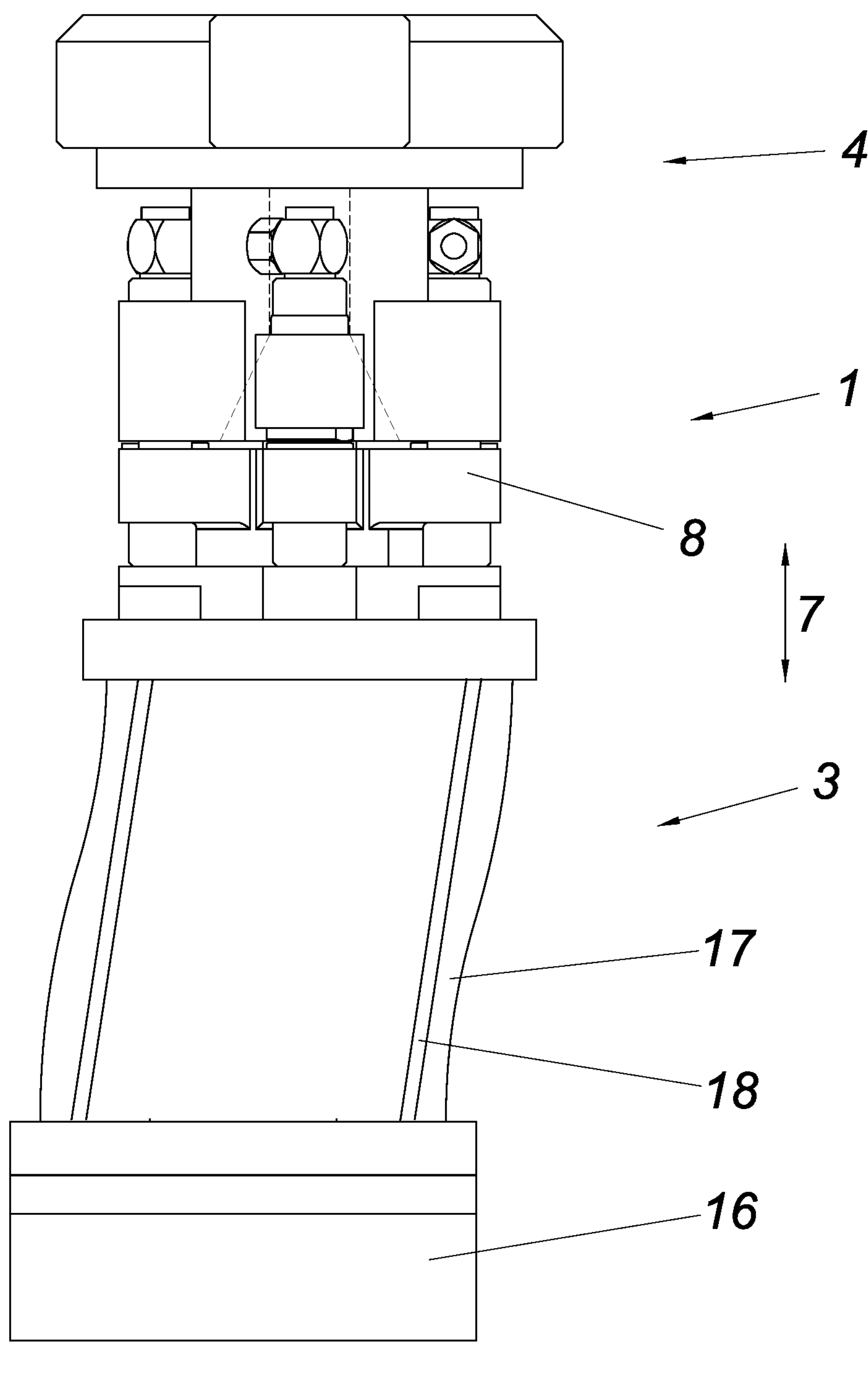
Figure 4:
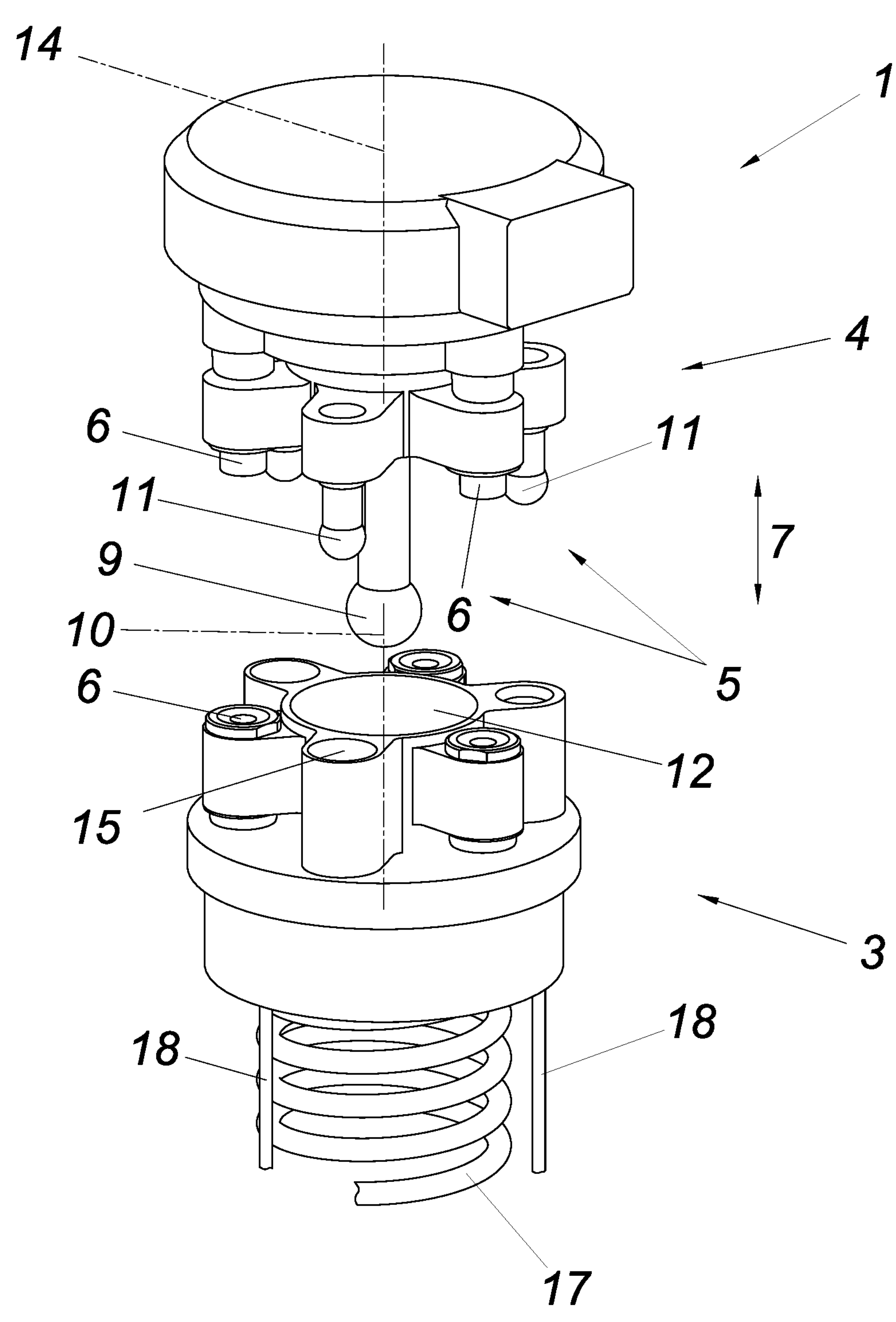
Figure 5:
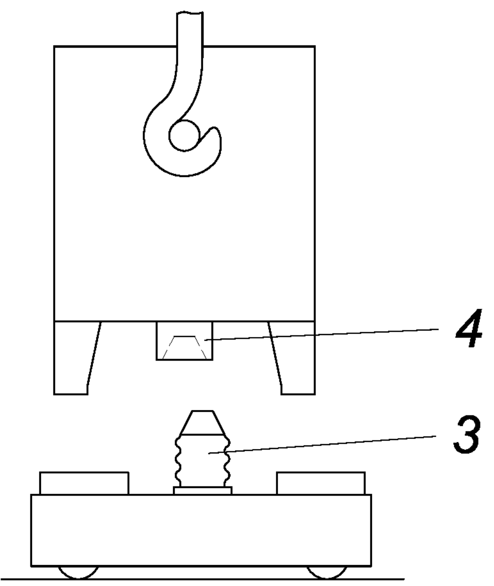
Figure 6:
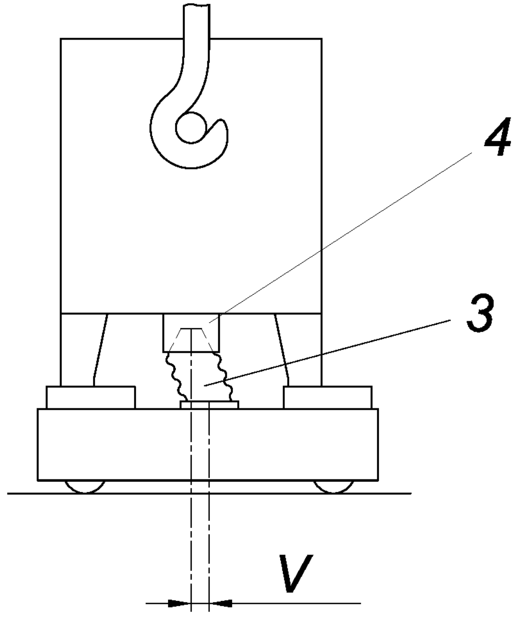
Figure 7:
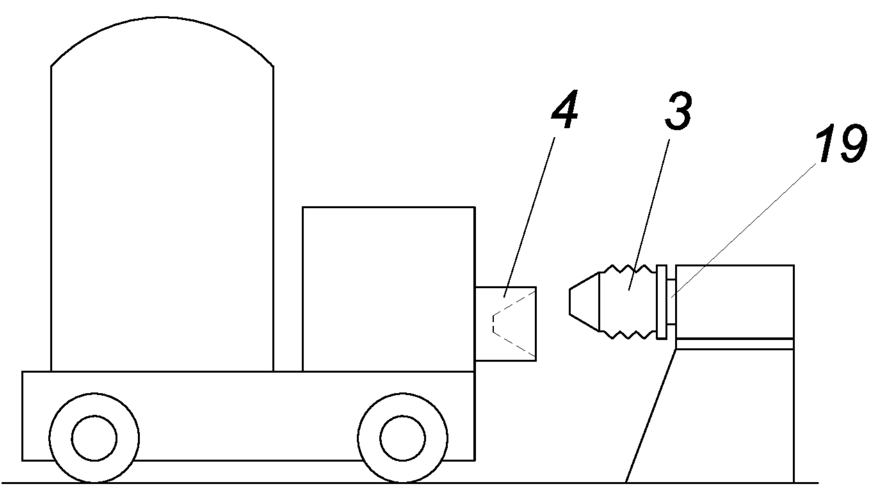
Figure 8:
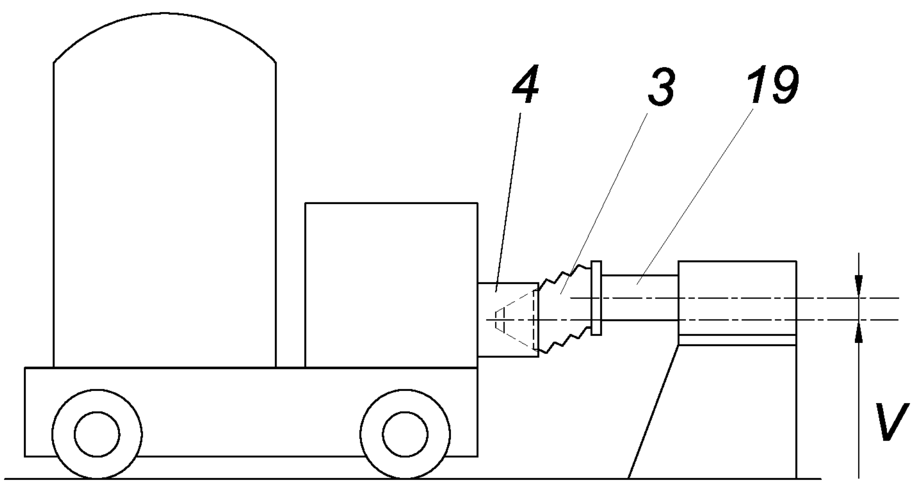

In the drawing, the subject matter of the invention is shown by way of example, wherein:

FIG. 1 shows an oblique view of a decoupled multi-coupling,

FIG. 2 shows a side view of a decoupled multi-coupling with a lateral offset between the coupling plug and coupling socket, FIG. 3 shows the coupled multi-coupling from FIG. 2, FIG. 4 shows an oblique view of a design variant of a multi-coupling from FIG. 1, FIG. 5 shows a side view of an object with a decoupled multi-coupling, FIG. 6 shows the coupled object from FIG. 4 placed on a trolley, FIG. 7 shows a vehicle with decoupled multi-coupling in side view, and FIG. 8 shows the vehicle from FIG. 7 coupled to a charging station via the multi-coupling with the linear actuator extended.

Figure 9:
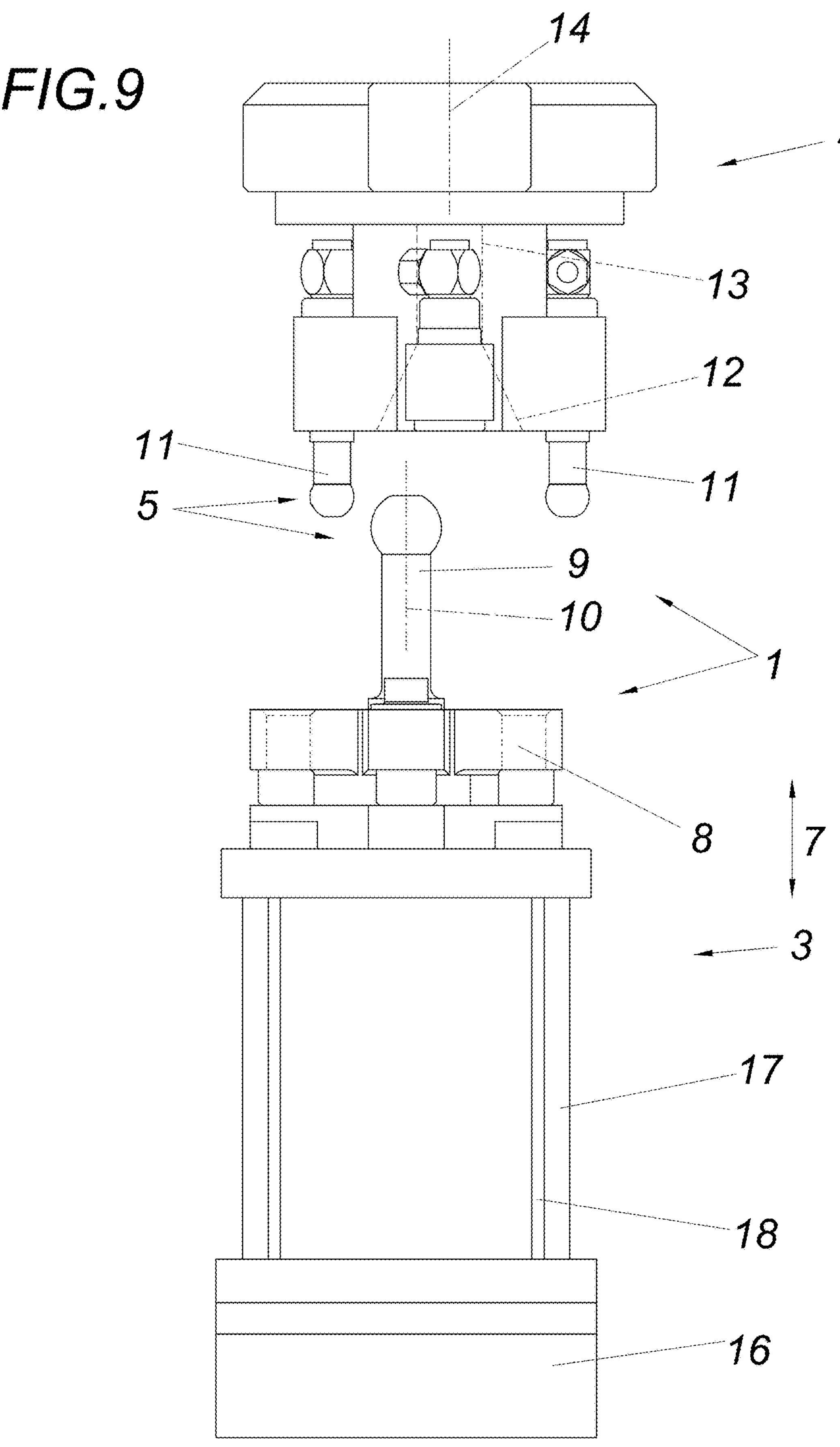

FIG. 9 is a view as in FIG. 2 of an alternate embodiment.

DETAILED DESCRIPTION OF THE PREFERRED EMBODIMENT

The multi-coupling 1 for coupling lines 2 included an alignment aid 5 assigned to a first coupling part 3, in this case a coupling plug, and a second coupling part 4, in this case a coupling socket, for compensating for offset tolerances when threading the first coupling part 3 into the second coupling part 4 when coupling media couplings 6.

On the coupling plug side, the alignment aid 5 has a central pre-centering journal 9 projecting from a coupling carrier 8 of the first coupling part 3, which is mounted in a floating manner transverse to the coupling direction 7, towards the second coupling part 4 in the coupling direction 7, and three precision centering journals 11 projecting from the coupling carrier 8 in the coupling direction 7 and arranged radially around the pre-centering journal axis 10. The coupling direction 7 is marked with a double arrow, since both the first to the second coupling part, the second to the first coupling part and both coupling parts can be moved towards each other for coupling. The spherical precision centering journal heads are set back with respect to the spherical pre-centering journal head in coupling direction 7. In addition, the alignment aid 5 comprises, on the coupling socket side, a central catching jaw 12 which merges into a pre-centering guide 13 in the coupling direction 7 and is equipped with three precision centering guides 15 arranged around the pre-centering guide axis 14. The receiving openings of precision centering guides 15 and catching jaw 12 are located here, for example, in a plane that is not necessarily common on a coupling-socket-side coupling carrier.

The coupling carrier 8 is mounted so as to float with respect to a carrier base 16 transversely to the coupling direction 7, for which purpose a helical spring 17 is arranged between the coupling carrier 8 and the carrier base 16 about the pre-centering journal axis 10, which spring is pretensioned by tensioning means 18 acting at one end on the coupling carrier 8 and at the other end on the carrier base 16.

In the exemplary embodiment shown in FIG. 4, the pre-centering journal 9 and the precision centering journals 11 are assigned to the second coupling part 4, and the catching jaw 12 and precision centering guides 15 are assigned to the first coupling part 3, which is mounted so that it floats transversely to the coupling direction 7.

The pre-centering journal 9 can itself form a media coupling, as can the precision centering journals 11. The coupling carrier 8 accommodates a number of media couplings 6 arranged in a star shape around the pre-centering journal axis 10. In the coupling carrier 8, media couplings 6 are mounted in a floating manner transverse to the coupling direction.

A decoupled multi-coupling can also be properly coupled with a lateral offset V between the first and second coupling parts.

In the exemplary embodiment according to FIGS. 7 and 8, the first coupling part 3 is moved to the second coupling part 4 by means of a linear actuator 19. The offset V shows the automatic compensation in case of a deviation transverse to the coupling direction. Likewise, the spring-elastic design compensates for deviations in the axial direction.

In an alternate embodiment, seen in FIG. 9, pre-centering and precision centering journals are each assigned to the opposite other coupling part. One coupling part has a coupling carrier floating transversely to the direction of coupling, and the alignment aid on one coupling part has a central pre-centering journal projecting from a coupling carrier in the coupling direction and at least one precision centering guide arranged around the pre-centering journal axis for a precision centering journal. The alignment aid on the other coupling part has a central catching jaw and at least one precision centering journal arranged radially around the catching jaw and projecting from the coupling carrier in the coupling direction. The head of the precision centering journal projects less far beyond the coupling carrier associated with it than the head of the pre-centering journal from the other coupling carrier associated with it. The central catching jaw merges into a pre-centering guide in the coupling direction. The coupling carrier is preferably mounted resiliently in the coupling direction.

The invention claimed is:

1. A multi-coupling comprising:

coupling lines;

an alignment aid being associated with a first coupling part and a second coupling part and compensating for offset tolerances during threading of the first coupling part into the second coupling part during coupling of media couplings;

at least one of said coupling parts has a coupling carrier that is supported for movement transversely with respect to a coupling direction;

the alignment aid having, on one of the coupling parts, a central pre-centering journal that projects from the coupling carrier in the coupling direction and at least one precision centering journal protruding from the coupling carrier in the coupling direction and arranged radially outward of a pre-centering journal axis;

wherein the at least one precision centering journal has a head that is set back in the coupling direction with respect to a head of the pre-centering journal; and wherein the alignment aid has a coupling socket side on the other of the coupling parts, said coupling socket side having thereon a central catching jaw that merges in the coupling direction into a pre-centering guide configured to coact with the pre-centering journal; and at least one precision centering guide, arranged outward of a pre-centering guide axis configured to coact with the at least one precision centering journal; and wherein the coupling carrier is supported for movement with respect to a carrier base transversely to the coupling direction; and wherein at least one spring is arranged between the coupling carrier and the carrier base, and said spring is pretensioned between the coupling carrier and the carrier base by a tensioning structure acting at one end thereof on the coupling carrier and at an opposing end thereof on the carrier base, said tensioning structure causing the coupling carrier to remain in an axially parallel relationship to the carrier base during said movement transverse to the coupling direction.

2. The multi-coupling according to claim 1, wherein the coupling carrier, the carrier base, and the tensioning structure form an articulated parallelogram arrangement providing at least approximately axis-parallel alignment of the coupling parts during coupling of the coupling lines.

3. The multi-coupling according to claim 1, wherein the at least one spring includes three springs arranged in a star shape around the longitudinal axis of the coupling, wherein the springs are helical springs.

4. The multi-coupling according to claim 1, wherein the pre-centering journal operates as a media coupling or an actuator.

5. The multi-coupling according to claim 1, wherein the at least one precision centering journal operates as a media coupling or an actuator.

6. The multi-coupling according to claim 1, wherein the coupling carrier accommodates a plurality of media couplings arranged in a star shape around the pre-centering journal axis.

7. The multi-coupling according to claim 1, wherein the media couplings are mounted floatingly transversely to the coupling direction in the coupling carrier.

8. The multi-coupling according to claim 1, wherein the tensioning structure comprises a plurality of tensioning members each extending between and connected with the coupling carrier and the carrier base, and applying tension that compresses the at least one spring therebetween.

9. A multi-coupling comprising:

coupling lines;

an alignment aid being associated with a first coupling part and a second coupling part and compensating for offset tolerances during threading of the first coupling part into the second coupling part during coupling of media couplings;

wherein the coupling parts each have a coupling carrier, one of said coupling carriers being supported for movement transversely to a coupling direction;

wherein the alignment aid has, on one of the coupling parts, a central pre-centering journal projecting from the coupling carrier thereof in the coupling direction and at least one precision centering guide, arranged outward of a pre-centering journal axis of the central pre-centering journal; and wherein the alignment aid has, on the other of said coupling parts, a central catching jaw and at least one precision centering journal that projects from the coupling carrier of said other of said coupling parts in the coupling direction and is arranged radially outward of the catching jaw and is configured to coact with the at least one precision centering guide;

wherein a head of the at least one precision centering journal projects less far beyond the coupling carrier thereof than a head of the pre-centering journal from the other coupling carrier thereof; and wherein the central catching jaw merges in the coupling direction into a pre-centering guide; and wherein said one of said coupling carriers is supported for movement with respect to a carrier base transversely to the coupling direction; and wherein at least one spring is arranged between the coupling carrier and the carrier base, and said spring is pretensioned between said one of said coupling carriers and the carrier base by a tensioning structure acting at one end thereof on said one of said coupling carriers and at an opposing end thereof on the carrier base, said tensioning structure and the spring causing said one of said coupling carriers to remain in an approximately axially parallel relationship to the carrier base during said movement transverse to the coupling direction.

10. The multi-coupling according to claim 9, wherein the coupling carrier, the carrier base, and the tensioning structure form an articulated parallelogram arrangement providing at least approximately axis-parallel alignment of the coupling parts during coupling of the coupling lines.

11. The multi-coupling according to claim 10, wherein the at least one spring includes three springs arranged in a star shape around the longitudinal axis of the coupling, wherein the springs are helical springs.

12. The multi-coupling according to claim 9, wherein the pre-centering journal operates as a media coupling or an actuator.

13. The multi-coupling according to claim 9, wherein the at least one precision centering journal operates as a media coupling or an actuator.

14. The multi-coupling according to claim 9, wherein the coupling carrier accommodates a plurality of media couplings arranged in a star shape, around the pre-centering journal axis.

15. The multi-coupling according to claim 9, wherein the media couplings are mounted floatingly transversely to the coupling direction in the coupling carrier.

16. The multi-coupling according to claim 9, wherein the tensioning structure comprises a plurality of tensioning members each extending between and connected with the coupling carrier and the carrier base, and applying tension that compresses the at least one spring therebetween.

17. A coupling plug configured for use in a multi-coupling, said coupling plug comprising:

a central pre-centering journal projecting in a coupling direction from a coupling carrier; and three precision centering journals arranged radially around a pre-centering journal axis and projecting from the coupling carrier in the coupling direction;

wherein the precision centering journal heads are set back relative to the pre-centering journal head in the coupling direction, and wherein a plurality of media couplings are arranged in a star shape around the pre-centering journal axis; and wherein the coupling carrier is supported on a carrier base for movement transverse to the coupling direction; and wherein at least one spring is arranged between the coupling carrier and the carrier base, and said spring is pretensioned between the coupling carrier and the carrier base by a tensioning structure acting at one end thereof on the coupling carrier and at an opposing end thereof on the carrier base, said tensioning structure causing the coupling carrier to remain in an axially parallel relationship to the carrier base during said movement transverse to the coupling direction.

18. The coupling plug according to claim 17, wherein the tensioning structure comprises a plurality of tensioning members each extending between and connected with the coupling carrier and the carrier base, and applying tension that compresses the at least one spring therebetween; and the tensioning members forming a parallelogram arrangement providing substantially parallel alignment of the coupling carrier and the carrier base during the movement transverse to the coupling direction.

19. A coupling socket configured for use in a multi-coupling, said coupling socket comprising:

a central catching jaw in a coupling carrier, said central catching jaw merging into a pre-centering guide in a coupling direction;

three precision centering guides arranged on the coupling carrier in a star shape around a pre-centering guide axis; and the plurality of media couplings being arranged in a star shape around the pre-centering guide axis; and wherein the coupling carrier is supported on a carrier base for movement transverse to the coupling direction; and wherein at least one spring is arranged between the coupling carrier and the carrier base, and said spring is pretensioned between the coupling carrier and the carrier base by a tensioning structure acting at one end thereof on the coupling carrier and at an opposing end thereof on the carrier base, said tensioning structure causing the coupling carrier to remain in an axially parallel relationship to the carrier base during said movement transverse to the coupling direction.

20. The coupling socket according to claim 19, wherein the tensioning structure comprises a plurality of tensioning members each extending between and connected with the coupling carrier and the carrier base, and applying tension that compresses the at least one spring therebetween; and the tensioning members forming a parallelogram arrangement providing substantially parallel alignment of the coupling carrier and the carrier base during the movement transverse to the coupling direction.

* * * * *